United States Patent
Molander et al.

(10) Patent No.: US 7,565,621 B2
(45) Date of Patent: Jul. 21, 2009

(54) METHODS AND APPARATUS FOR PROVIDING GRAPHICAL INDICATORS AND INLINE CONTROLS FOR RELATING AND MANAGING PORTLETS IN A GRAPHICAL USER INTERFACE

(75) Inventors: Mark E. Molander, Cary, NC (US); Karen Ruth Kluttz, Raleigh, NC (US); Deanna M. Shaw, Gilroy, CA (US); Duane Neale Barret, San Jose, CA (US); Zhao Lu, Campbell, CA (US); Darren Kelly Upton, San Francisco, CA (US); Ted Frank Slupesky, Portland, OR (US); David Lynn Merbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 11/062,190

(22) Filed: Feb. 17, 2005

(65) Prior Publication Data

US 2006/0184882 A1   Aug. 17, 2006

(51) Int. Cl.
*G06F 3/048* (2006.01)
(52) U.S. Cl. .................. 715/805; 715/243; 715/742; 715/804
(58) Field of Classification Search ............... 715/513, 715/742, 744, 733, 760, 771, 243, 804, 805, 715/241
See application file for complete search history.

(56) References Cited

U.S. PATENT DOCUMENTS

| | | | |
|---|---|---|---|
| 6,380,955 B1 * | 4/2002 | Kanungo et al. | 715/764 |
| 6,683,629 B1 * | 1/2004 | Friskel et al. | 715/804 |
| 2001/0009016 A1 | 7/2001 | Hofmann et al. | 709/219 |
| 2001/0034771 A1 | 10/2001 | Hutsch et al. | 709/217 |
| 2002/0169852 A1 | 11/2002 | Schaeck | 709/218 |
| 2003/0115292 A1 | 6/2003 | Griffin et al. | 709/219 |
| 2003/0149722 A1 | 8/2003 | Jolley et al. | 709/203 |
| 2003/0167315 A1 | 9/2003 | Chowdhry et al. | 709/218 |
| 2003/0188163 A1 | 10/2003 | Fischer et al. | 713/170 |
| 2004/0068554 A1 | 4/2004 | Bales et al. | 709/218 |
| 2004/0090969 A1 | 5/2004 | Jerrard-Dunne et al. | 370/395.54 |
| 2004/0098451 A1 | 5/2004 | Mayo | 709/203 |
| 2004/0133660 A1 | 7/2004 | Junghuber et al. | 709/219 |

FOREIGN PATENT DOCUMENTS

JP         2004078276         3/2004

* cited by examiner

*Primary Examiner*—Namitha Pillai
(74) *Attorney, Agent, or Firm*—Harrington & Smith, PC

(57) ABSTRACT

The present invention concerns methods and apparatus for implementing an interactive graphical user interface having the ability to graphically depict the relationships between or among multiple portlets. In one aspect, the present invention relates a child sub-portlet to a parent portlet with at least one graphical indicator when the child sub-portlet is surfaced from the parent portlet. Other aspects of the present invention concern in-line tools integrated in the graphical indicators for managing portlet operations. The graphical indicators and inline controls of the present invention allow a user to accurately and precisely control portlets.

30 Claims, 14 Drawing Sheets

METHODS AND APPARATUS FOR PROVIDING GRAPHICAL INDICATORS AND INLINE CONTROLS FOR RELATING AND MANAGING PORTLETS IN A GRAPHICAL USER INTERFACE

TECHNICAL FIELD

The present invention generally concerns portlet-based graphical user interfaces, and more particularly concerns methods and apparatus for providing both graphical indicators which demonstrate the relationships between and among portlets visible in a graphical user interface, and controls inline to the graphical indicators for managing portlet operations.

BACKGROUND

Portlet-based user interfaces are quickly becoming very common for use in web sites as well as in web-based administrative consoles. Problems have been encountered in the shift to portlet-based user interfaces. In particular, known methods and apparatus for implementing portlet capability in graphical user interfaces lack both means for graphically indicating relationships among related portlets, and controls for managing operations concerning related portlets.

A common situation where this is encountered occurs when a graphical user interface displays multiple base ("parent") portlets, where each of the parent portlets can launch multiple sub-portlets ("child"). In such situations, after having launched one or more child sub-portlets, it may be difficult for a user to preserve the relation in her mind between parent portlets and child sub-portlets. This is particularly true because no visual cues are provided to the user to indicate relations between or among multiple portlets and sub-portlets.

An example of portlet management in accordance with the prior art is depicted in FIG. 1. FIG. 1 depicts a page 100 containing two parent portlets 110 and 120. After a child sub-portlet 112 is surfaced from parent portlet 110, there is no cue provided indicating whether the child sub-portlet 112 is related to parent portlet 110 or 120. The situation becomes even more confusing when a child sub-portlet 122 is surfaced from parent portlet 120. The lack of visual cues becomes particularly bothersome when the user desires to simplify the page by submerging one of the child sub-portlets. Without careful examination of the surfaced child sub-portlets, the user might inadvertently submerge the wrong child sub-portlet.

Accordingly, those skilled in the art desire methods and apparatus that provide visual cues which indicate the relationship among parent portlets and child sub-portlets. In particular, such methods and apparatus would enable a user to quickly perceive from visual cues provided by graphical features the relationships between and among parent portlets and child sub-portlets.

In addition, those skilled in the art desire methods and apparatus that enable users to quickly expand and collapse peer sub-portlets. Such functionality would make long multi-portlet pages more manageable upon collapsing, and then allow a user to quickly and easily surface them for display later.

SUMMARY OF THE PREFERRED EMBODIMENTS

The foregoing and other problems are overcome, and other advantages are realized, in accordance with the following embodiments of the present invention. The present invention comprises a computer system for displaying an interactive graphical user interface having portlet display capability, where the graphical user interface displays both graphical indicators for relating child sub-portlets to parent portlets, and portlet management controls inline to the graphical indicators.

A first alternate embodiment of the present invention comprises a signal-bearing medium tangibly embodying a program of machine-readable instructions executable by a digital processing apparatus of a computer system to perform operations for controlling a graphical user interface system, where the graphical user interface system is capable of displaying multiple parent portlets in a single graphical user interface, the operations comprising: displaying a page comprised of at least one parent portlet; receiving a command to surface a child sub-portlet from the parent portlet; and surfacing the child sub-portlet into the page, whereby when the child sub-portlet is displayed, at least one graphical indicator is used to provide a visual cue indicating that the parent portlet and child sub-portlet are related.

A second alternate embodiment of the present invention comprises a computer system for displaying an interactive graphical user interface, the computer system comprising: at least one memory to store at least one program of machine-readable instructions, where the at least one program performs operations to display the interactive graphical user interface when executed; and at least one processor coupled to the at least one memory, where the at least one processor performs at least the following operations when the at least one program is executed: displaying a page comprised of at least one parent portlet in the graphical user interface; receiving a command to surface a child sub-portlet from the parent portlet; and surfacing the child sub-portlet into the page, whereby when the child sub-portlet is displayed, at least one graphical indicator is used to provide a visual cue indicating that the parent portlet and child sub-portlet are related.

A third alternate embodiment of the present invention comprises a user interface control system method comprising: displaying on a display device of a computer system an interactive graphical user interface having portlet display capability, wherein a page displayed in the interactive graphical user interface comprises at least one parent portlet; receiving a command to surface a child sub-portlet from the parent portlet; and surfacing the child sub-portlet into the page, whereby when the child sub-portlet is displayed, at least one graphical indicator is used to provide a visual cue indicating that the parent portlet and child sub-portlet are related.

A fourth alternate embodiment of the present invention comprises a computer system for displaying an interactive graphical user interface, the computer system comprising: memory means for storing at least one program of machine-readable instructions, where the at least one program performs operations to display the interactive graphical user interface when executed; processor means coupled to the memory means for executing the at least one program of machine-readable instructions, where the processor means performs at least the following operations when the at least one program is executed: displaying a page comprised of at least one parent portlet; receiving a command to surface a child sub-portlet from the parent portlet; surfacing the child sub-portlet into the page; and displaying at least one graphical indicator means for providing a visual cue that the parent portlet and child sub-portlet are related.

Thus it is seen that embodiments of the present invention overcome the limitations of the prior art. Known methods and apparatus for managing portlet-based graphical user interfaces suffer from a number of limitations. In particular, when child sub-portlets are surfaced in current portlet-based graphical user interfaces, the relationship between the parent portlet and child sub-portlets is not indicated in any way. Accordingly, a user of such a system can become confused concerning the relationships between or among displayed portlets.

In contrast, the present invention provides methods and apparatus for indicating the relationship between or among parent portlets and child sub-portlets. A user of a system made in accordance with the present invention is provided with visual cues that tie parent portlets to child sub-portlets in such a way that it is easy to keep track of the relationships between displayed portlets.

In addition, known methods and apparatus for managing portlet-based graphical user interfaces provide little or no functionality for controlling portlet surfacing and submerging operations in a way that provides cues to a user concerning the relationships between, for example, a child sub-portlet that is being submerged and a parent portlet that will continue to be displayed. Accordingly, in situations where many portlets are displayed, a user may inadvertently submerge a child sub-portlet when the relationship of the child sub-portlet to a parent portlet is not apparent.

In contrast, methods and apparatus operating in accordance with the present invention provide in-line portlet-management tools that simplify the surfacing and submerging of child sub-portlets.

In conclusion, the foregoing summary of the alternate embodiments of the present invention is exemplary and non-limiting. For example, one of ordinary skill in the art will understand that one or more aspects or steps from one alternate embodiment can be combined with one or more aspects or steps from another alternate embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
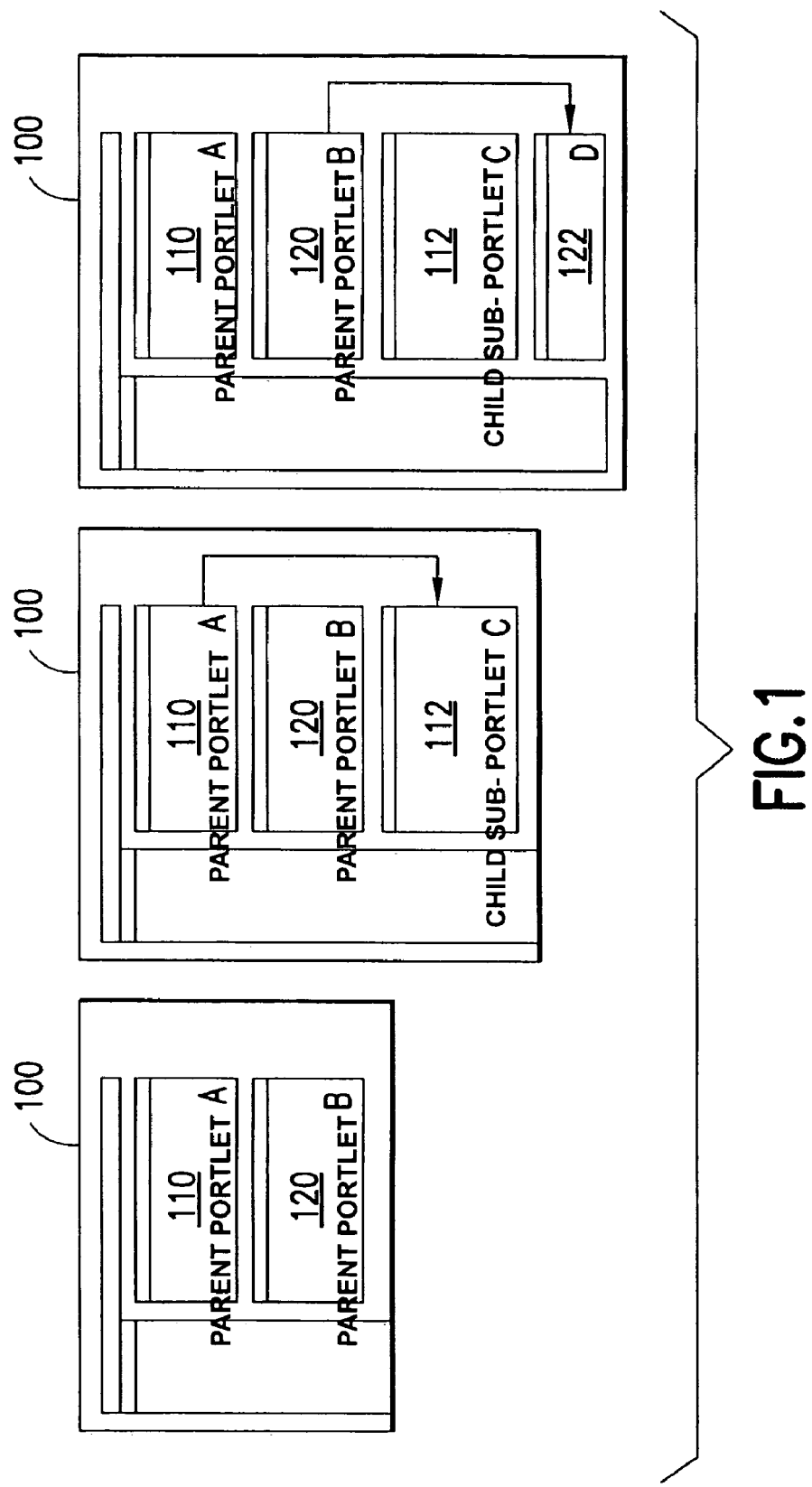
FIG. 1 depicts a graphical user interface surfacing child sub-portlets into a page in accordance with the prior art.
Figure 2:
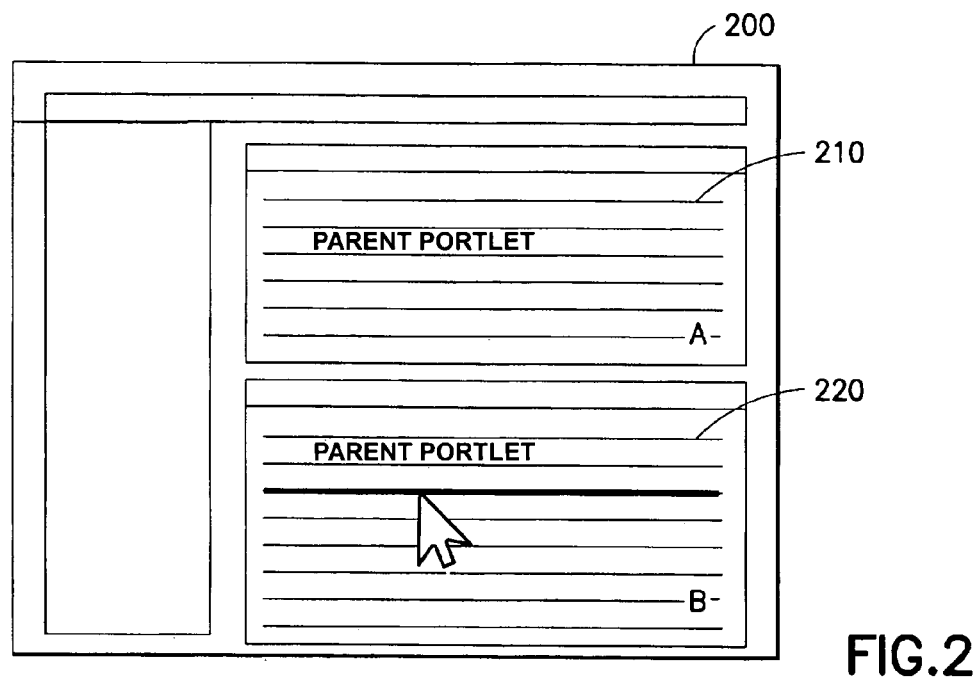
FIG. 2 depicts a graphical user interface in accordance with the prior art displaying two parent portlets on a page before any child sub-portlets have been launched.
Figure 3:
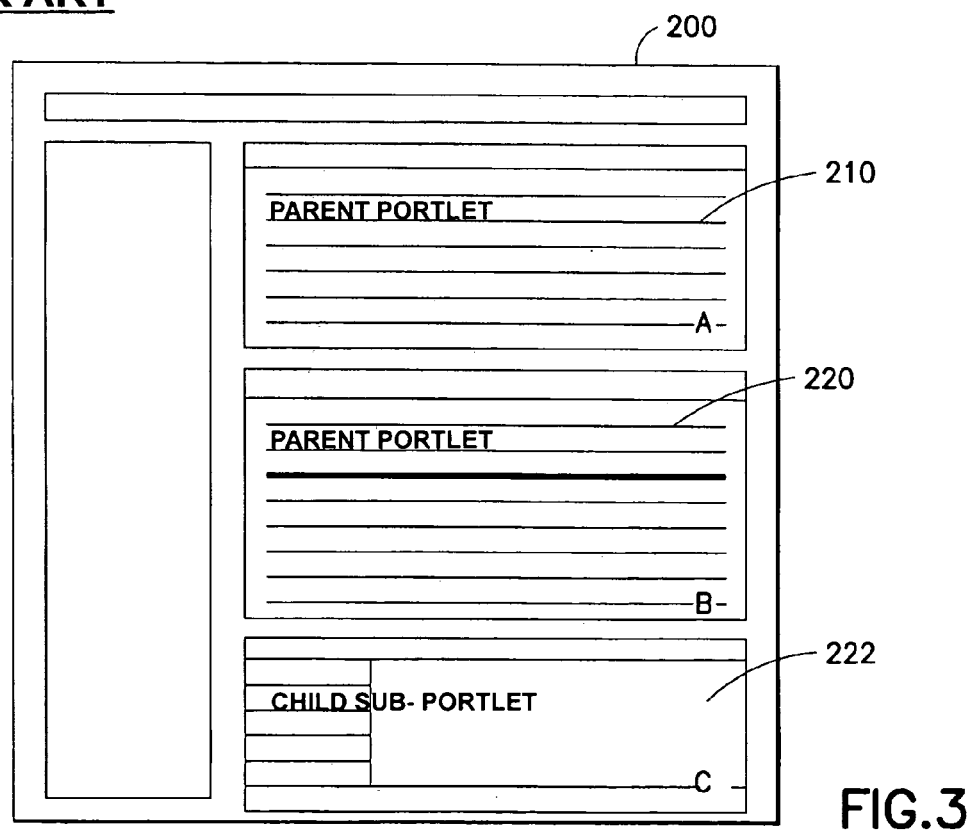
FIG. 3 depicts the graphical user interface of FIG. 2 after a child sub-portlet has been launched into the page in accordance with the prior art.
Figure 4:
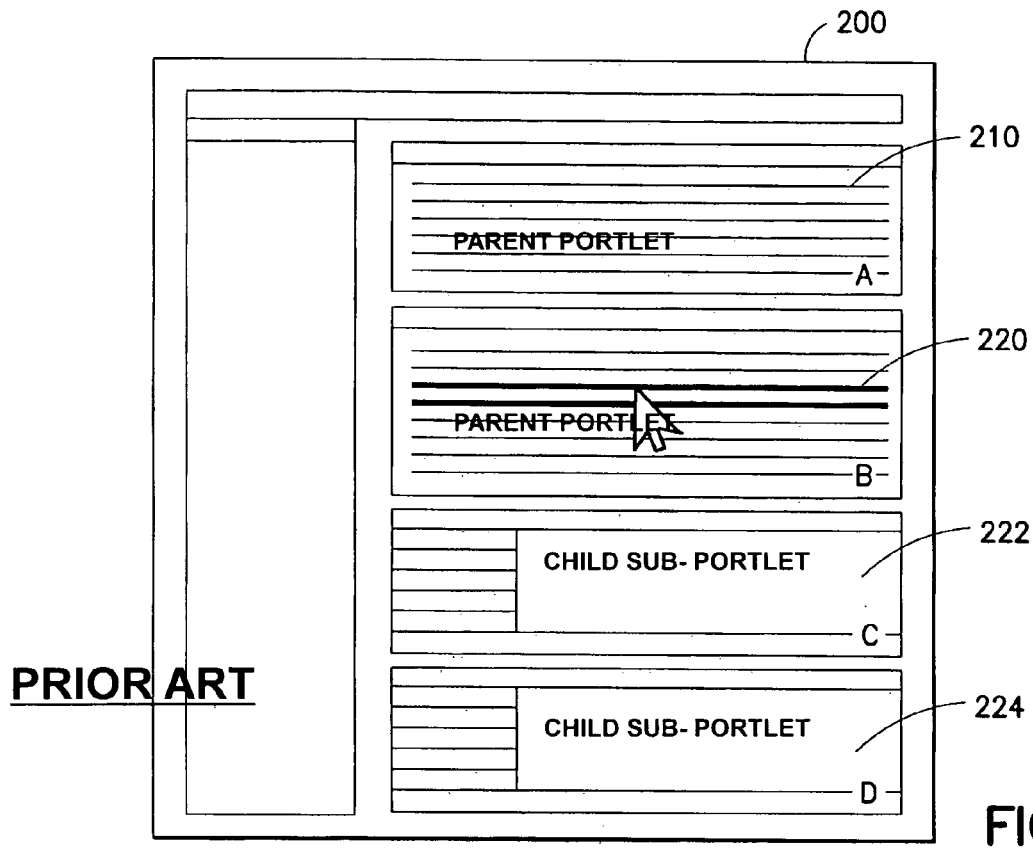
FIG. 4 depicts the graphical user interface of FIGS. 2 and 3 after a second child sub-portlet has been launched into the page in accordance with the prior art.

A typical situation encountered in the prior art is depicted in FIGS. 2-4. FIG. 2 depicts the initial state of a page 200 displaying two parent portlets 210 and 220. The user then launches a child sub-portlet 222 from parent portlet 220, and the result is depicted in FIG. 3. As is apparent from FIG. 3, there are no visual cues tying the parent portlet 220 to the child sub-portlet 222. This is a source of confusion to users, and it is an object of the invention to provide methods and apparatus for overcoming this limitation of the prior art. The situation worsens when the user launches another child sub-portlet 224 from parent portlet 220 as depicted in FIG. 4. Again, a user is presented with a situation where there are no visual cues indicating to the user the relationships between the parent portlets 210, 220 and child sub-portlets 222, 224.

Another problem not immediately evident from this demonstration but appreciated by the applicants is the confusion encountered when seeking to manage the sub-portlets. Since there are no visual cues provided to the user, the user may inadvertently submerge the incorrect child sub-portlet when attempting to de-clutter the page 200. Accordingly, those skilled in the art desire controls for managing portlet operations that are in some way integrated in graphical cues used to indicate relationships between parent portlets and child sub-portlets.

Figure 5:
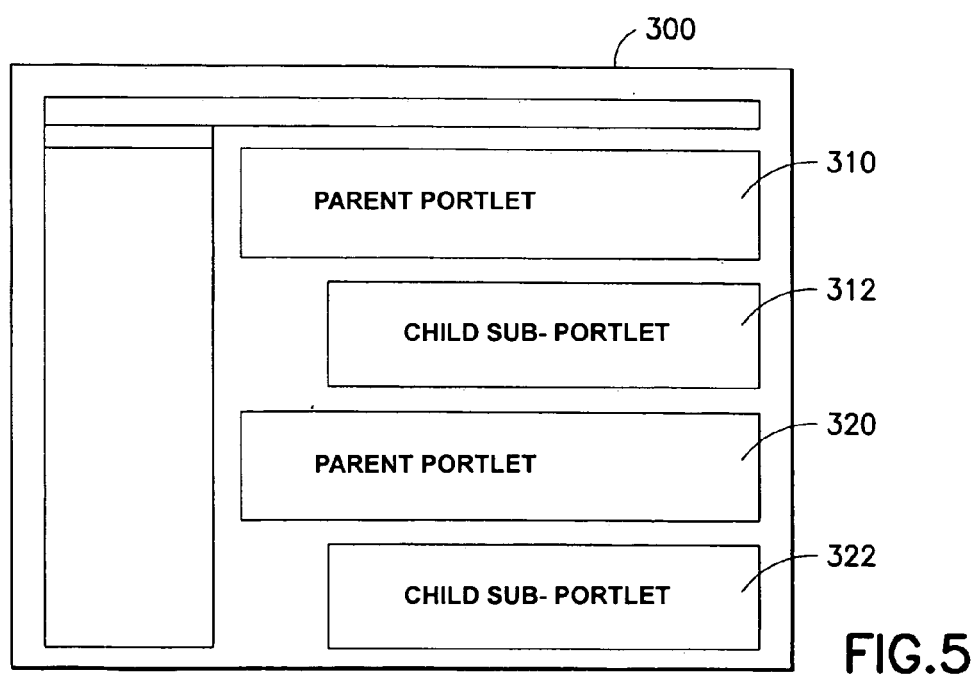
FIG. 5 depicts a graphical user interface after two child sub-portlets have been launched into a page in accordance with an embodiment of the present invention.

A first aspect of the present invention is depicted in FIG. 5 which shows that child sub-portlets 312, 322 launched from parent portlets 310, 320 remain in close proximity to the parent portlets 310, 320 from which they were launched. In addition, the child sub-portlets are associated with the parent portlets by indentation. If multiple child sub-portlets are launched from the same parent portlet, in embodiments of the present invention multiple indentation levels may be used. Other combinations of grouping and indentation may be used to indicate relationships between parent portlets and child sub-portlets.

Figure 6:
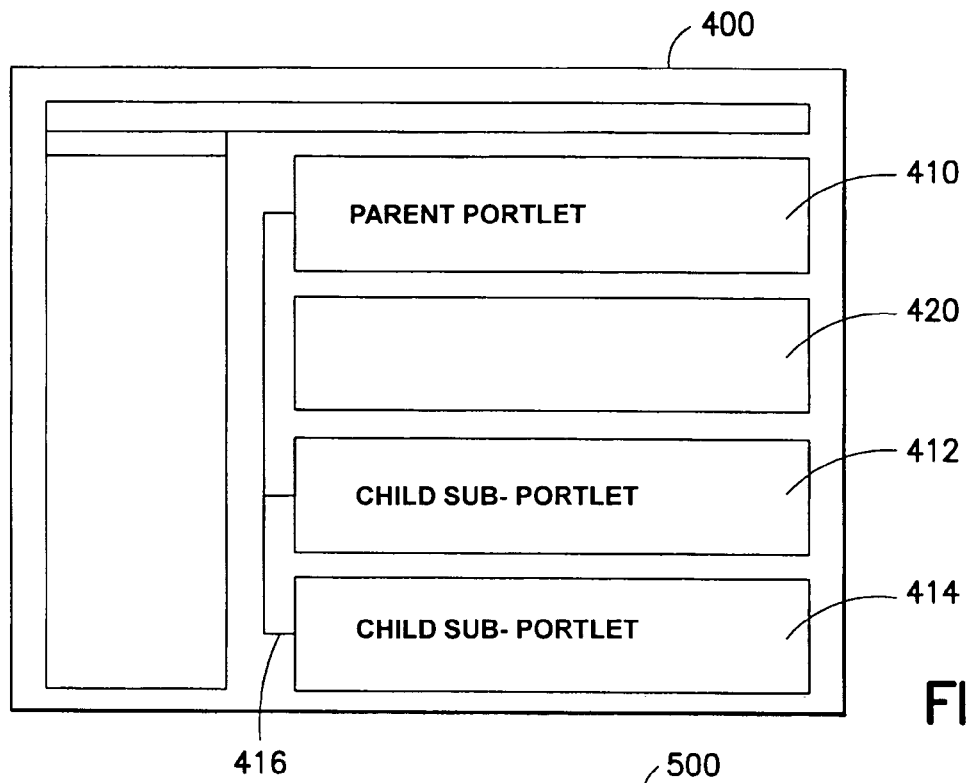
FIG. 6 depicts a graphical user interface after two child sub-portlets have been launched into a page in accordance with another embodiment of the present invention.

Another method of providing visual cues to a user to indicate relationships between parent portlets and child sub-portlets in accordance with embodiments of the present invention comprises providing a graphical connecting link that visually ties the parent portlet and child sub-portlet together. This is depicted in FIG. 6, where two child sub-portlets 412, 414 have been launched into a page 400 from a parent portlet 410. As is apparent, the connecting link 416 provides a visual cue to a user indicating that child sub-portlets 412, 414 have been launched from parent portlet 410.

Figure 7:
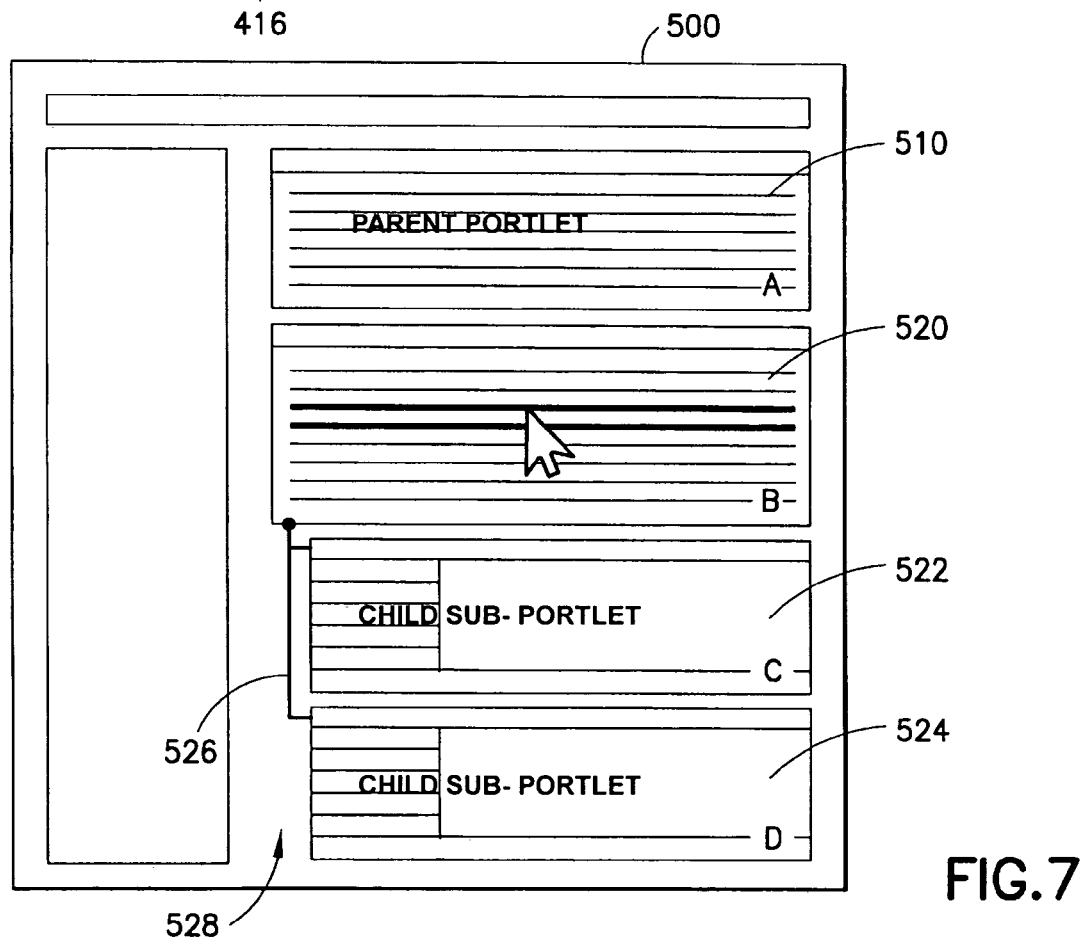
FIG. 7 depicts a graphical user interface after two child sub-portlets have been launched into a page in accordance with a further embodiment of the present invention.

In another embodiment of the present invention, the methods depicted in FIGS. 5 and 6 are combined, as shown in FIG. 7. Child sub-portlets 522, 524 launched into a page 500 from a parent portlet 520 are both indented as shown by the indentation 528 and tied to together by connecting links 526. Thus, these embodiments of the present invention overcome the limitations of the prior art by providing visual cues that indicate the relationships between or among parent portlets and child sub-portlets.

In various embodiments of the present invention, the connecting links may or may not cross. If connecting links connecting different groups of parent and child sub-portlets are permitted to cross, the links are preferably displayed in different colors. This will indicate that different-colored connecting links connect different groups of parent and child portlets.

Figure 8:
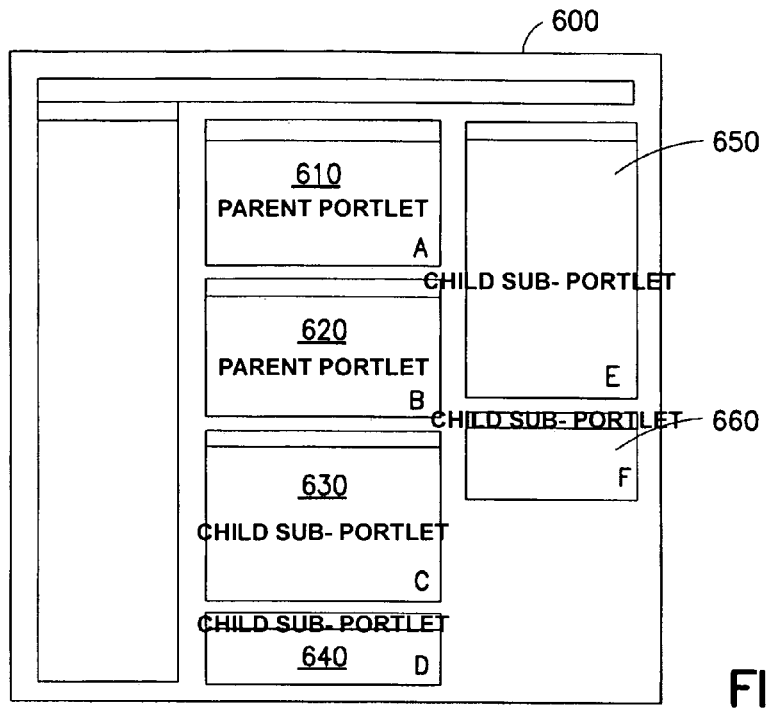
FIG. 8 depicts a graphical user interface displaying multiple parent portlets and child sub-portlets in accordance with the prior art.

In situations where many parent portlets and child sub-portlets appear on a page, the methods depicted in FIGS. 5-7 can become sub-optimal and contribute to an already busy page. In such situations, further embodiments of the present invention provide additional methods for indicating relationships between parent portlets and child sub-portlets. For example, as depicted in FIG. 8, many parent portlets 610, 620 and child sub-portlets 630, 640, 650 and 660 appear in a page 600. The foregoing methods are less desirable in such situations.

Figure 9:
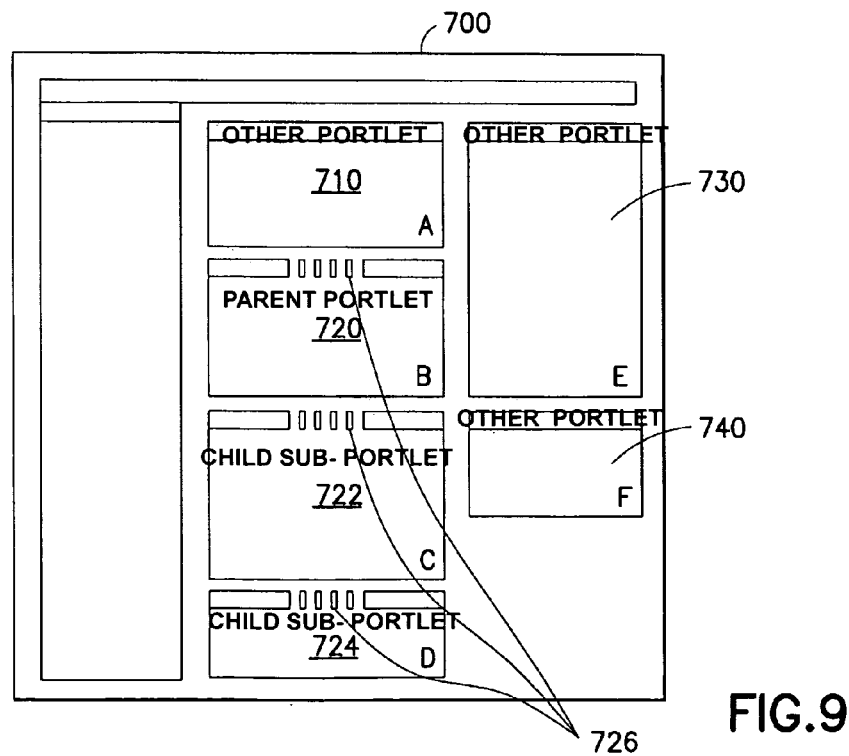
FIG. 9 depicts a graphical user interface displaying multiple parent portlets and child sub-portlets in accordance with an embodiment of the present invention.

Another embodiment of the present invention overcomes the limitations of the prior art by providing graphical indicators which are incorporated within the primary rectangular area of the portlets, such as the title bar or content area of the parent portlets and child sub-portlets. In the embodiment depicted in FIG. 9, a unique hash mark pattern 726 is used in the title bar of the parent portlet 720 and all child sub-portlets 722, 724 launched from the parent portlet 720 into a page 700. If a child sub-portlet were to be launched from a different parent portlet, a different hash mark pattern would be used to differentiate the first group of parent portlet and child sub-portlets from the second group of parent portlet and child sub-portlets. Thus, in this embodiment of the present invention, the graphical indicator serves to distinguish the group comprised of parent portlet 720 and child sub-portlets 722, 724 from the other portlets 710, 730, 740 appearing on the page. A user of a graphical user interface system having this ability would immediately recognize the relationships between parent portlets and child sub-portlets without extensive and time-consuming study.

Figure 10:
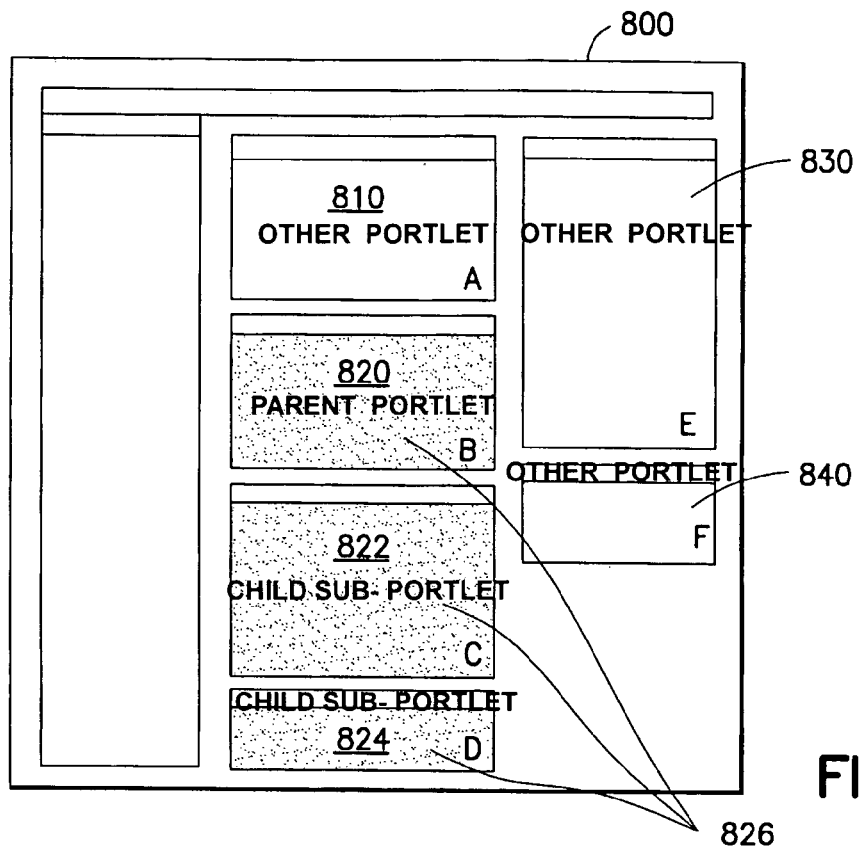
FIG. 10 depicts a graphical user interface displaying multiple parent portlets and child sub-portlets in accordance with another embodiment of the present invention.

In another embodiment depicted in FIG. 10, a unique background shading 826 is used to differentiate a group comprising a parent portlet 820 and related child sub-portlets 822, 824 from other portlets 810, 830, 840 appearing on the page 800. If a child sub-portlet were to be launched from one of the other portlets 810, 830, 840 a background different from 826 would be used to differentiate the new group from the previous group comprising parent portlet 820 and child sub-portlets 822, 824. Although shading is indicated in FIG. 10, different background colors or patterns could be used as well for differentiation purposes.

Figure 11:
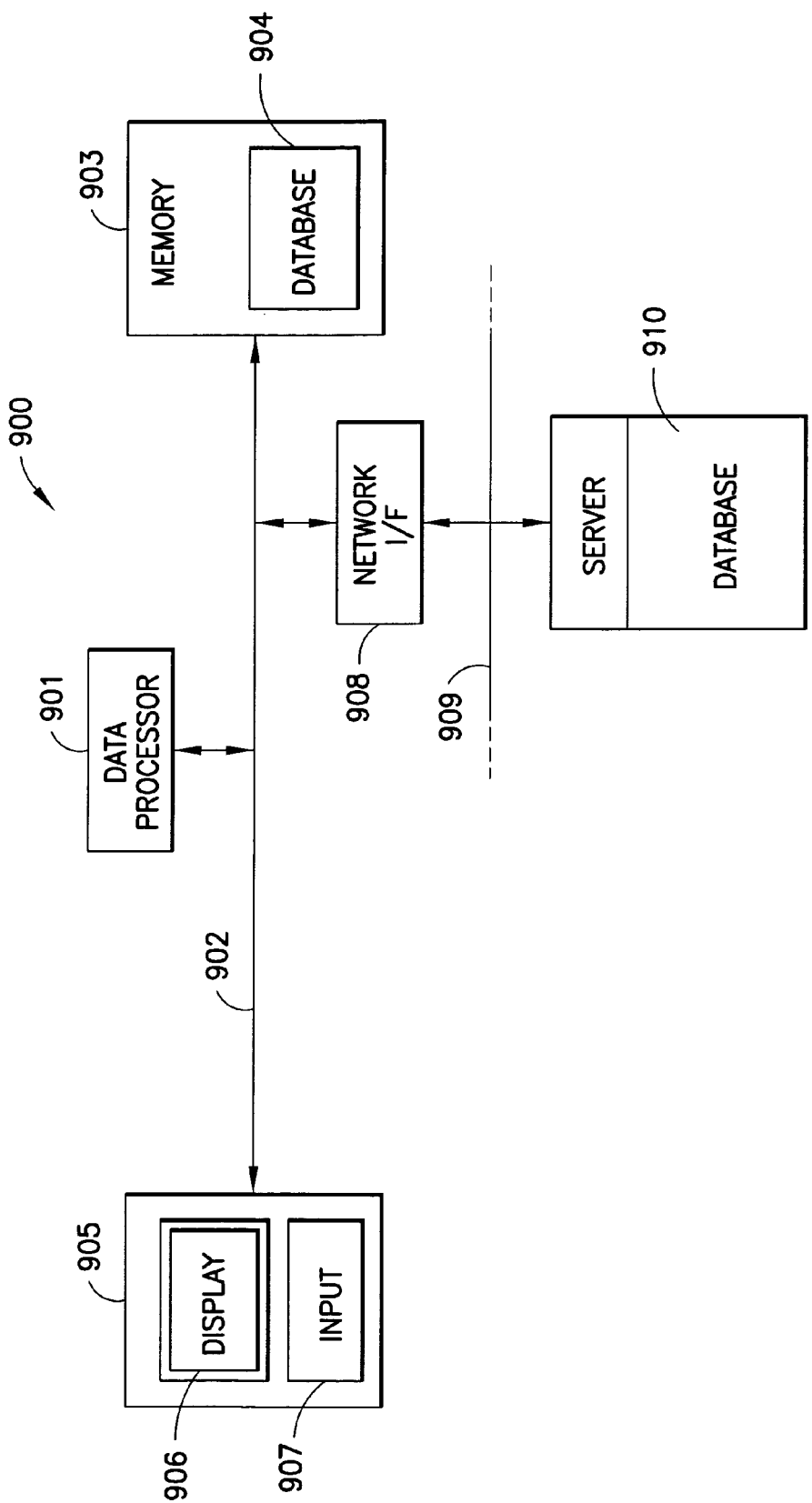
FIG. 11 depicts a block diagram of a computer system suitable for practicing the methods and apparatus of the present invention.
Figure 13:
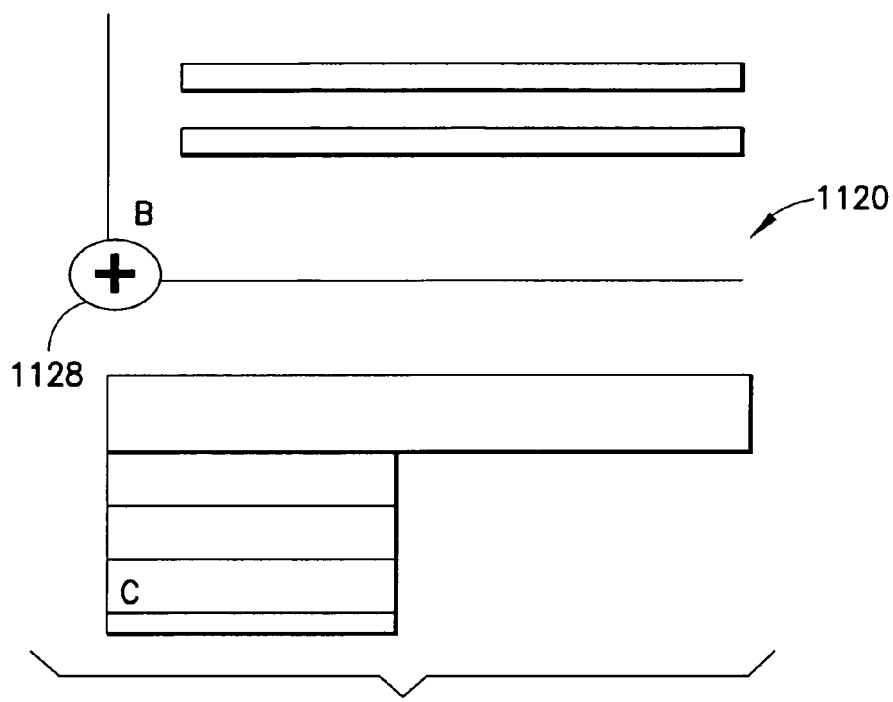
FIG. 13 depicts a zoomed-in view of a graphical user interface displaying a portlet control in accordance with another embodiment of the present invention.
Figure 14:
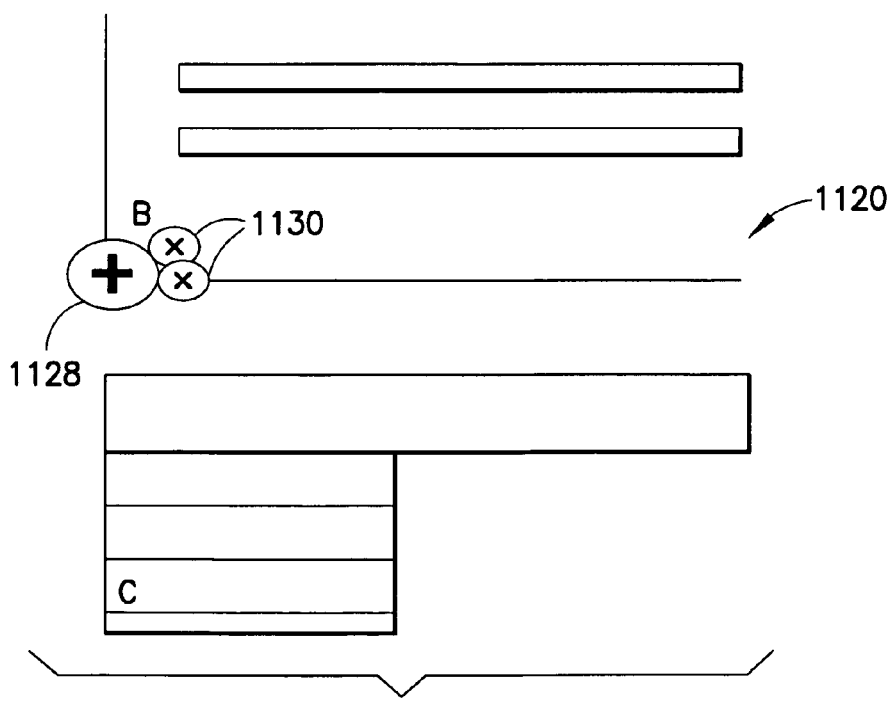
FIG. 14 depicts a zoomed-in view of a graphical user interface displaying a portlet control in accordance with a further embodiment of the present invention.

A computer system suitable for practicing the methods of the present invention is depicted in simplified form in FIG. 11. The data processing system 900 includes at least one data processor 901 coupled to a bus 902 through which the data processor may address a memory sub-system 903, also referred to herein simply as "memory" 903. The memory 903 may include RAM, ROM and fixed and removable disks and/or tape. The memory 903 is assumed to store at least one program comprising instructions for causing the processor 901 to execute methods in accordance with the present invention. Also stored in memory 903 is at least one database 904 containing information that may be managed using the portlet graphical indicators and controls of the present invention.

The data processor 901 is also coupled through the bus 902 to a user interface 905, preferably comprising both a graphical user interface ("GUI") that includes a user display device 906, such as a high resolution graphical CRT display terminal, a LCD display terminal, or any suitable display device, and a user input device 907, such as one or more of a keyboard, a mouse, a trackball, or a voice recognition interface. With these input/output devices and the methods and apparatus of the present invention, a user can easily manage portlet-based graphical user interfaces.

The data processor 901 may also be coupled through the bus 902 to a network interface 908 that provides bi-directional access to a data communications network 909, such as an intranet and/or the internet. In various embodiments of the present invention, a database 910 of information can be accessed over the internet and the methods and apparatus of the present invention can be used to more efficiently manage it.

In general, these teachings may be implemented using at least one software program running on a personal computer, a server, a microcomputer, a mainframe computer, a portable computer, an embedded computer, or by any suitable type of programmable data processor 901. Further, a program of machine-readable instructions capable of performing operations in accordance with the present invention may be tangibly embodied in a signal-bearing medium, such as a CD-ROM.

Figure 12:
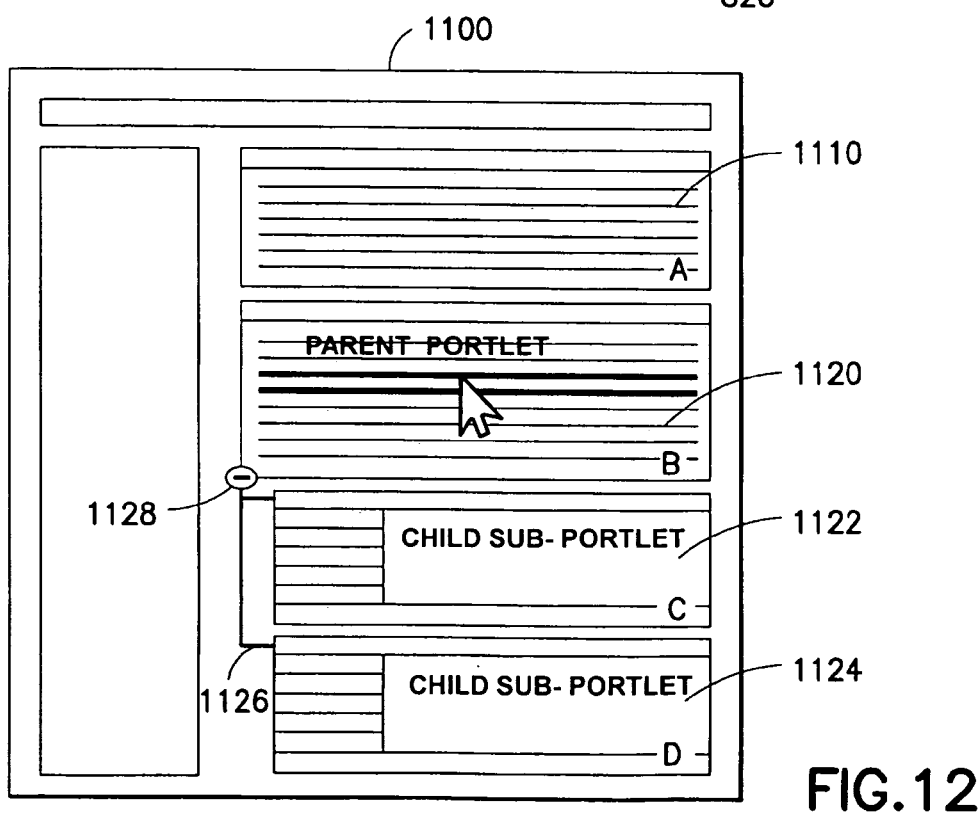
FIG. 12 depicts a graphical user interface displaying a portlet control inline to a graphical indicator demonstrating the relationship between a parent portlet and a child sub-portlet in accordance with the present invention.

Another aspect of the present invention is the incorporation of portlet management controls inline to the graphical indicators used for relating parent portlets to child sub-portlets. Such controls are depicted in FIGS. 12-23. In FIG. 12, selection of the collapser control ("–") 1128 inline to the graphical indicator 1126 tying the parent portlet 1120 to the child sub-portlets 1122, 1124 will minimize or hide the child sub-portlets 1122, 1124. Once the child sub-portlets are submerged, the collapser will be replaced by an expander control ("+") 1128 as shown in the zoomed view of FIG. 13. By clicking the expander 1128, the now-hidden child sub-portlets 1122,1124 will be shown. In a variant depicted in FIG. 14, a separate control 1130 is available to control each child sub-portlet 1122, 1124, for example, to conveniently close all peer sub-portlets with a single click, even when they might currently be hidden from view.

Figure 15:
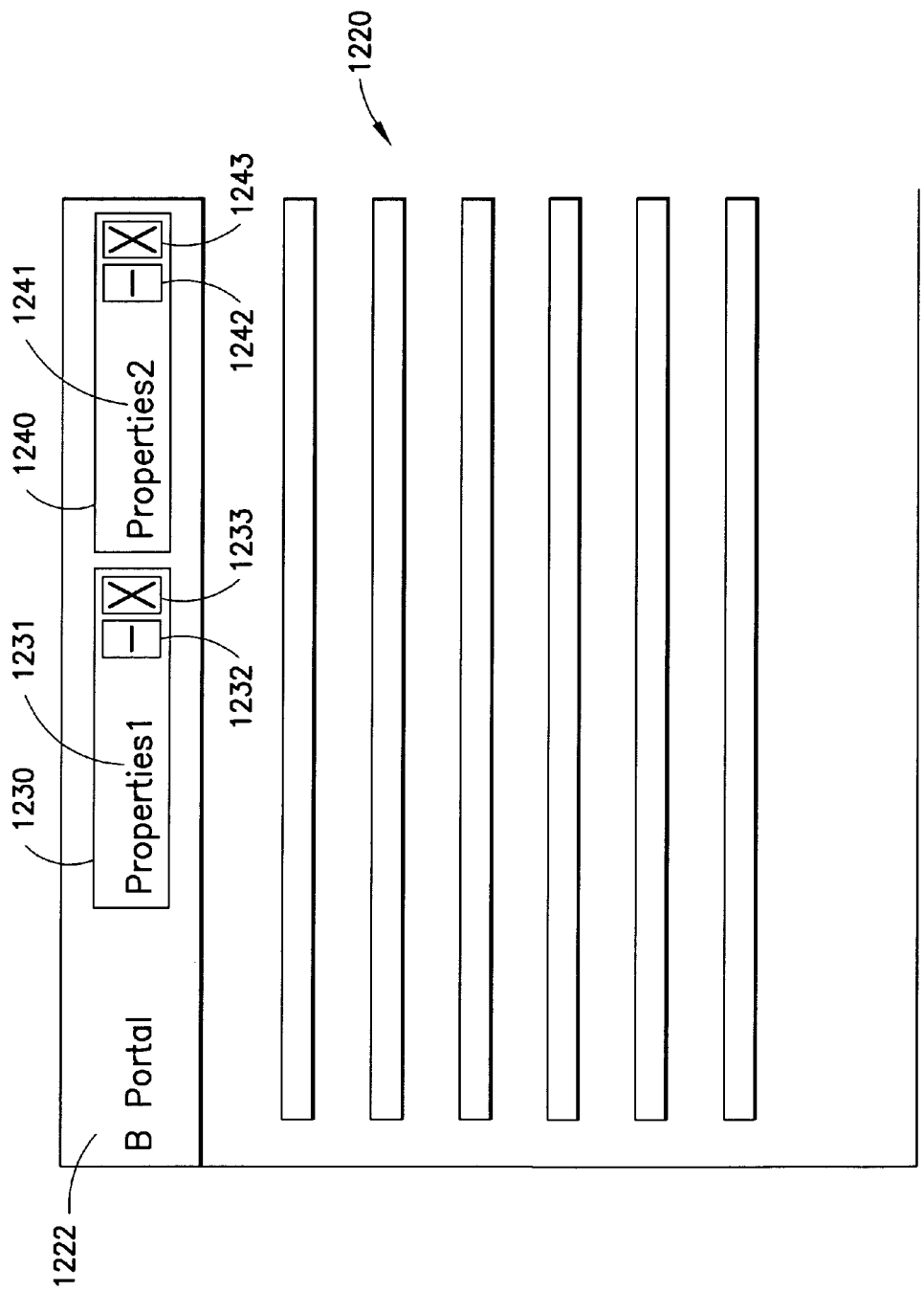
FIG. 15 depicts a zoomed-in view of a graphical user interface displaying a portlet control in accordance with yet another embodiment of the present invention.

In situations where there are many parent portlets open on a page and graphical indicators tying parent portlets and child sub-portlets together are impractical, other control options are used in embodiments of the present invention. For example, as depicted in FIG. 15, controls 1230, 1240 for managing sub-portlets are incorporated in the title bar 1222 of a parent portlet 1220. The child sub-portlets could be launched by selecting the mini-taskbar area 1231, 1241 outside of the "minimize" 1232, 1242 and "close" icons 1233, 1243. In this embodiment, once opened, a child sub-portlet could be minimized or closed using the "minimize" 1232, 1242 or "close" 1233, 1243 icons in the mini task-bars 1230, 1240.

Figure 16:
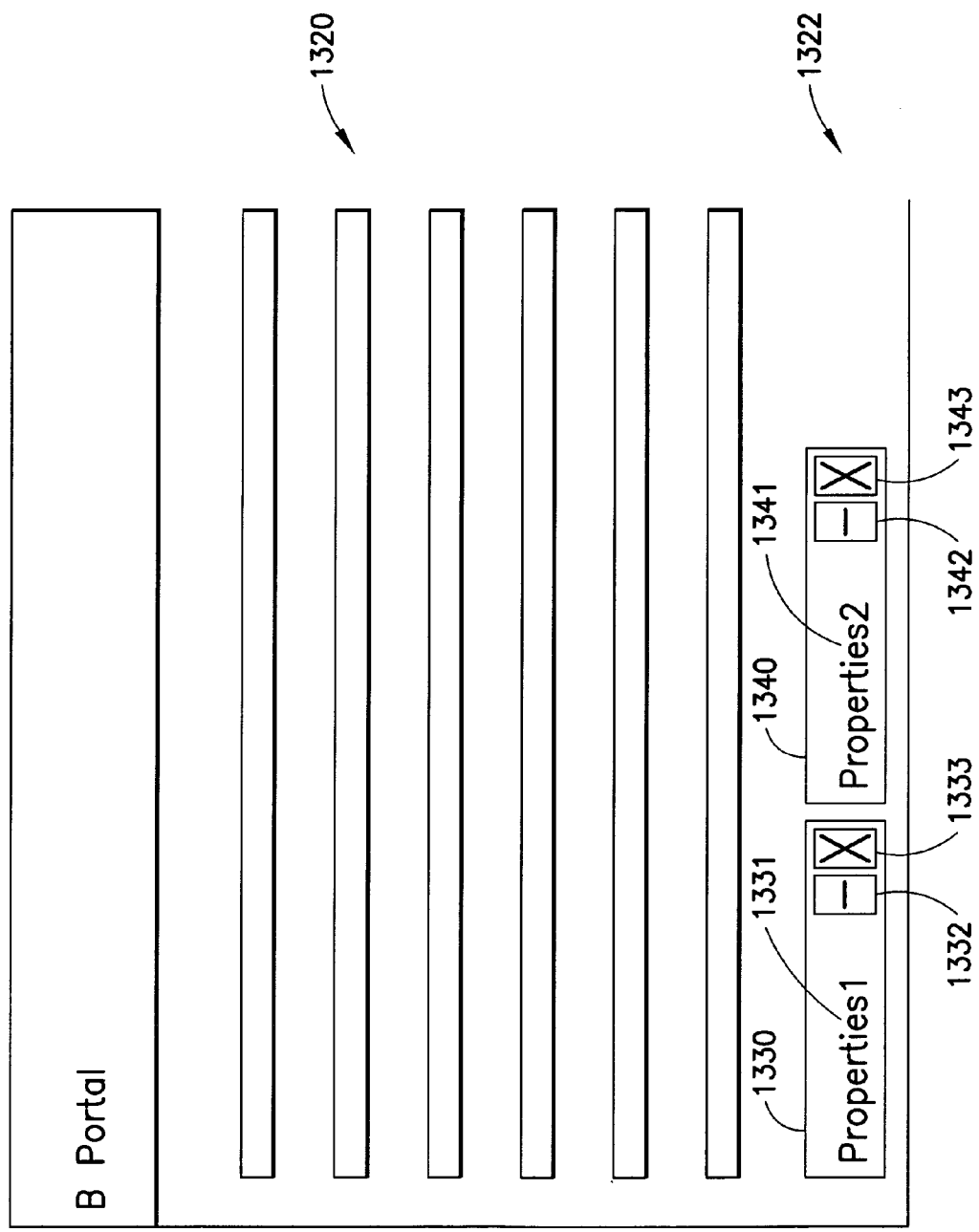
FIG. 16 depicts a zoomed-in view of a graphical user interface displaying a portlet control in accordance with a still further embodiment of the present invention.

In a variant of the embodiment depicted in FIG. 15, the child sub-portlet controls 1330, 1340 are positioned at the bottom 1322 of the parent portlet 1320, as shown in FIG. 16. The portlet controls operate otherwise like those depicted in FIG. 15. For example, if a user desired to launch the child sub-portlets, the user would select the areas of the mini taskbars 1331, 1341 outside of the "minimize" 1332, 1342 and "close" 1333, 1343 icons. Once visible, the user could minimize the child sub-portlets with the "minimize" icons 1332, 1342 or close the child sub-portlets with the "close" icons 1333, 1343.

Figure 17:
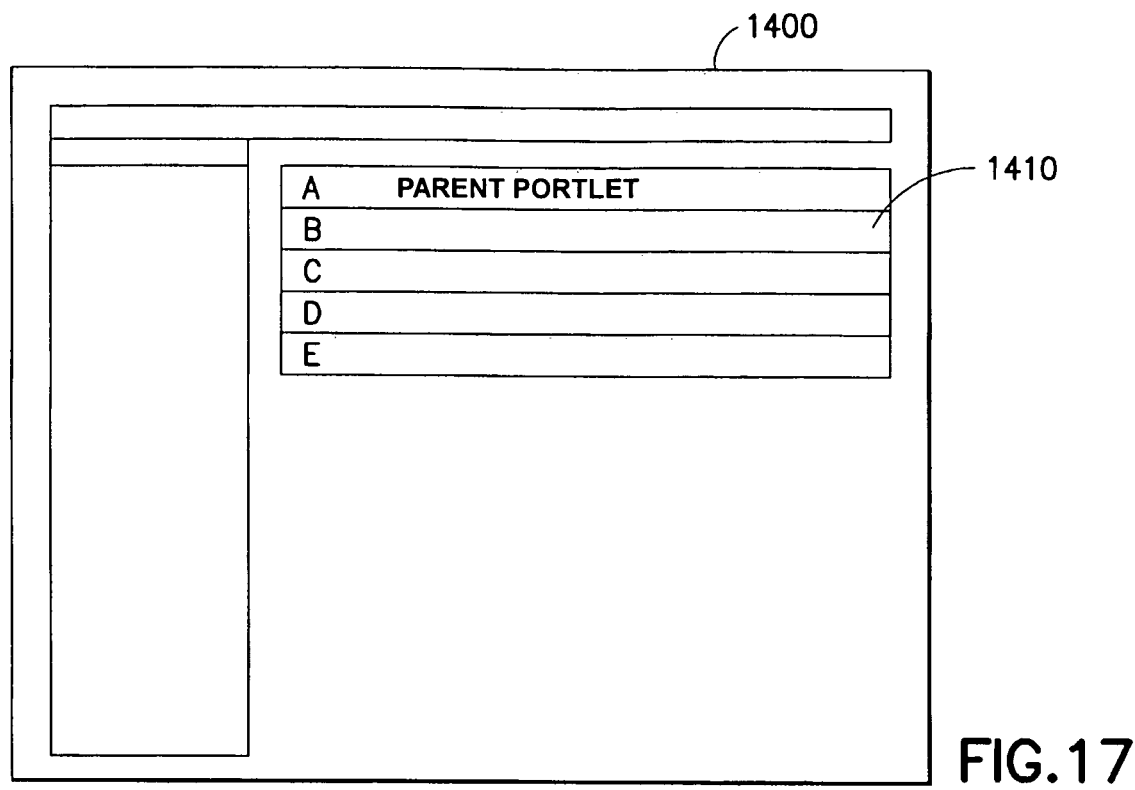
FIG. 17 depicts a parent portlet in a page before a child sub-portlet has been launched in accordance with another embodiment of the present invention.
Figure 18:
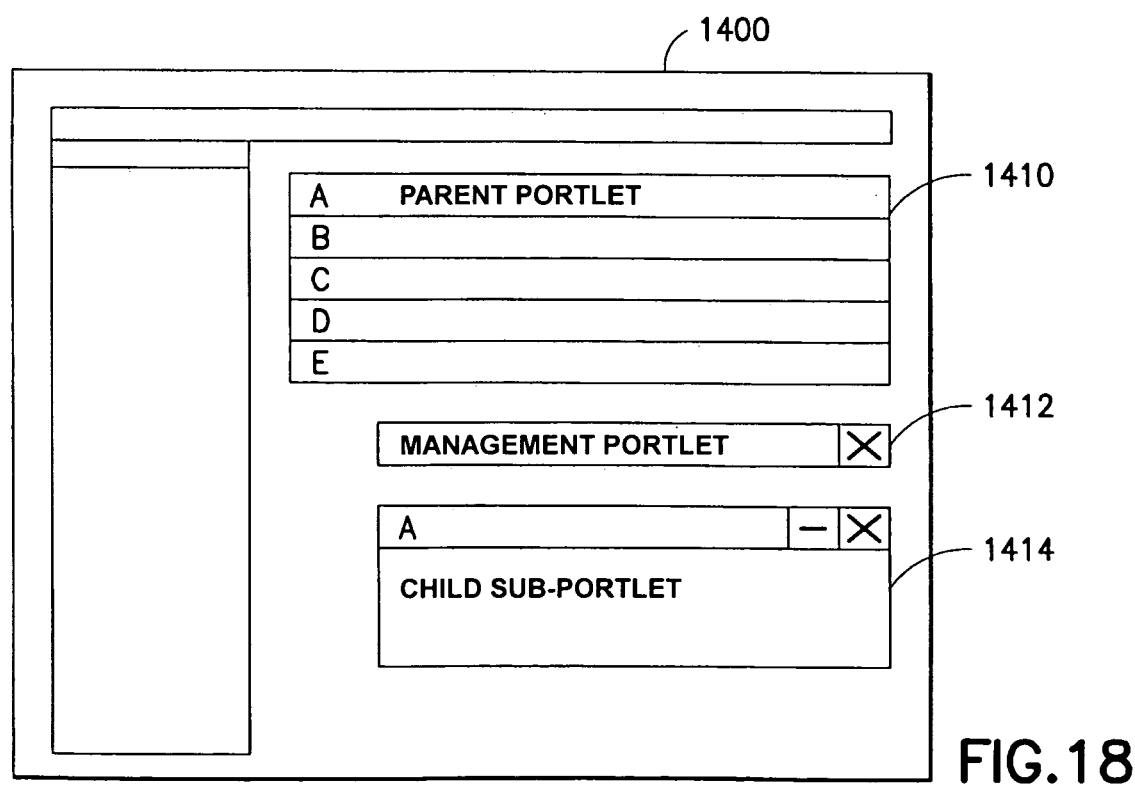
FIG. 18 depicts the page of FIG. 17 after a child sub-portlet and management portlet have been launched from the parent portlet all in accordance with another embodiment of the present invention.

Additional embodiments in accordance with the present invention for implementing portlet controls are depicted in FIGS. 17-21. FIG. 17 depicts a beginning state of a page 1400 currently displaying a parent portlet 1410. FIG. 18 depicts the state of the page 1400 after a child sub-portlet 1414 has been surfaced from parent portlet 1410. In addition to child sub-portlet 1414, a management portlet 1412 for managing child sub-portlets has also been launched. As is apparent from FIG. 18, both the management portlet 1412 and child sub-portlet 1414 were surfaced in close proximity to parent portlet 1410 and are also indented in relation to the parent portlet 1410. The physical proximity and indentation are graphical indicators showing that parent portlet 1410, management portlet 1412 and child sub-portlet are all related. Management portlet 1412 also contains controls for managing portlet operations either singly or on a group basis. For example, if additional portlets were to be surfaced from parent portlet 1410, then management portlet 1412 could be used to manage them as a group. For example, management portlet 1412 could be used to close or minimize the child sub-portlets. Once the child sub-portlets have been minimized, the management portlet 1412 could be used to surface the child sub-portlets. The management portlet 1412 itself can be closed or minimized through various controls.

Figure 19:
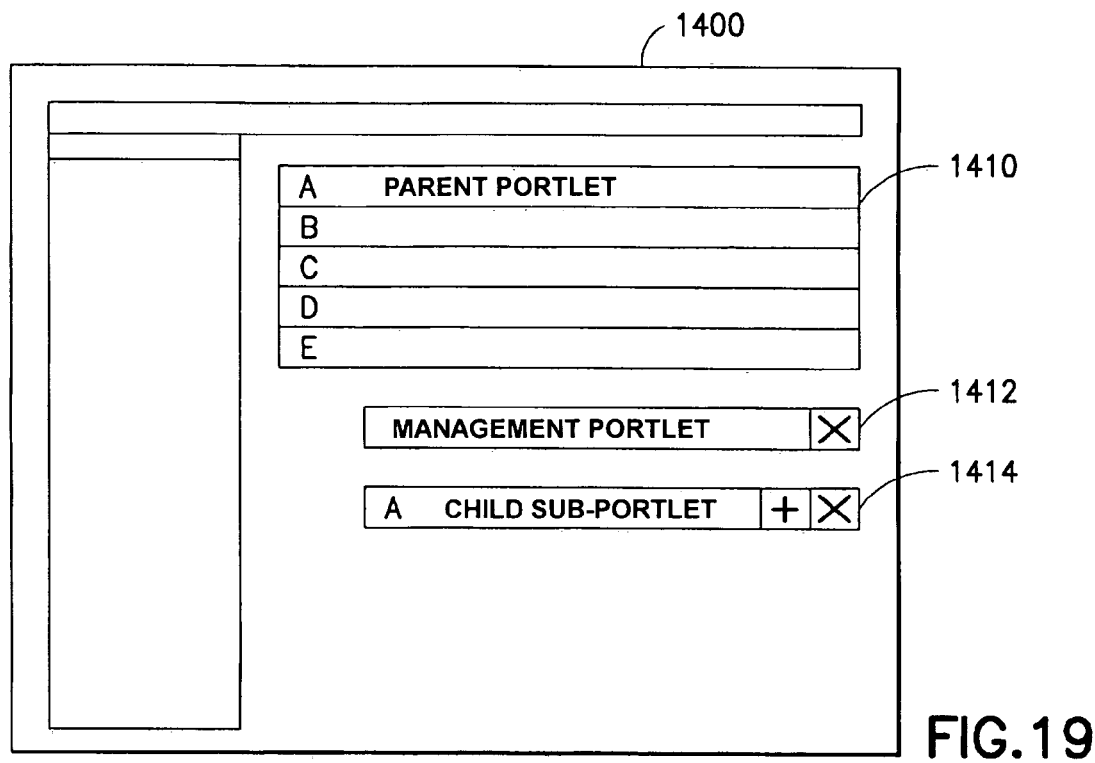
FIG. 19 depicts the page of FIG. 18 after the child sub-portlet has been minimized in accordance with another embodiment of the present invention.
Figure 20:
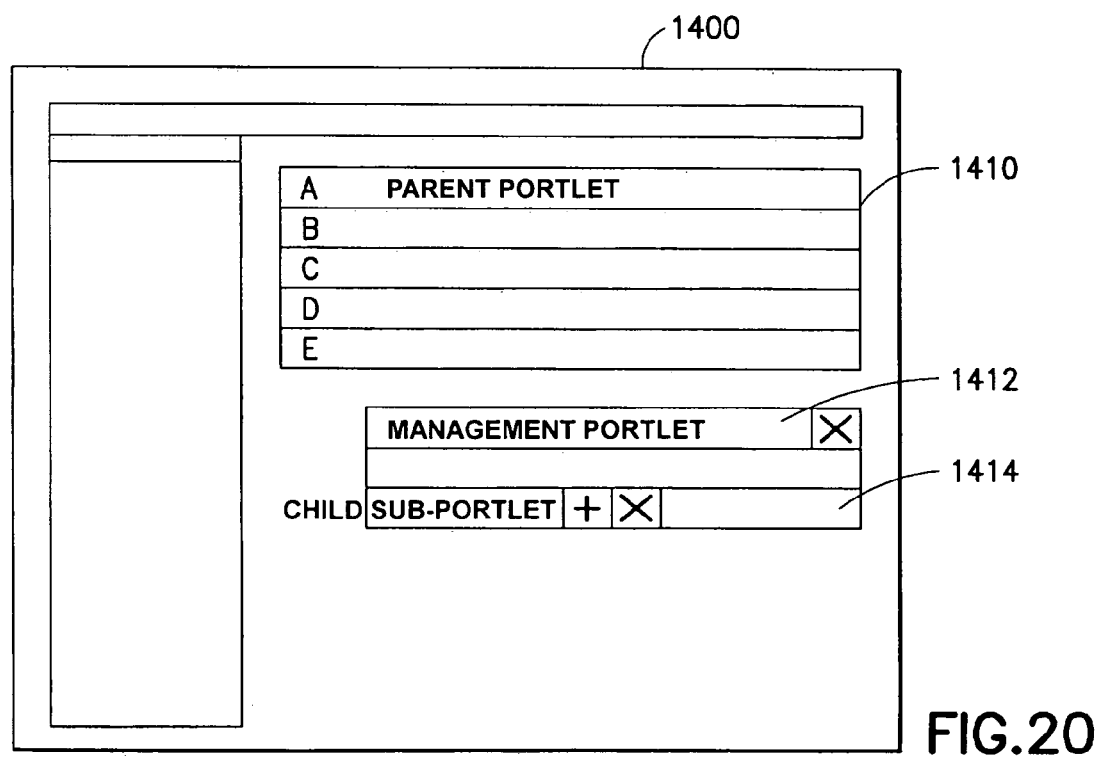
FIG. 20 depicts an alternate way in comparison to FIG. 19 for minimizing the child sub-portlet in accordance with another embodiment of the present invention.

FIG. 19 depicts the appearance of the page 1400 after the child sub-portlet 1414 has been minimized. Another option in accordance with the present invention is depicted in FIG. 20, where the child sub-portlet 1412 is incorporated in a table-like structure within the management portlet 1414.

Figure 21:
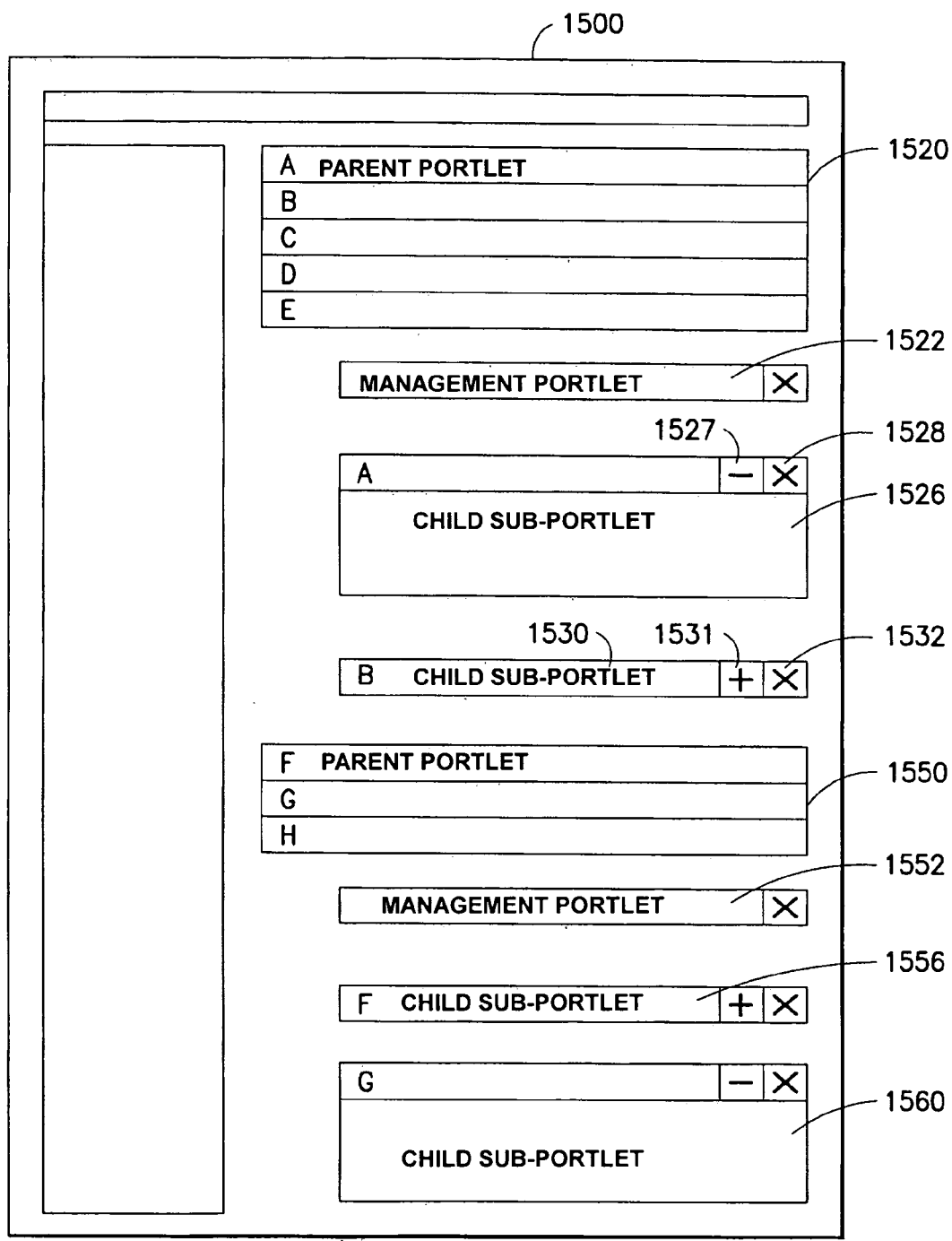
FIG. 21 depicts a page in which child sub-portlets have been launched from multiple parent portlets in accordance with another embodiment of the present invention.
Figure 22:
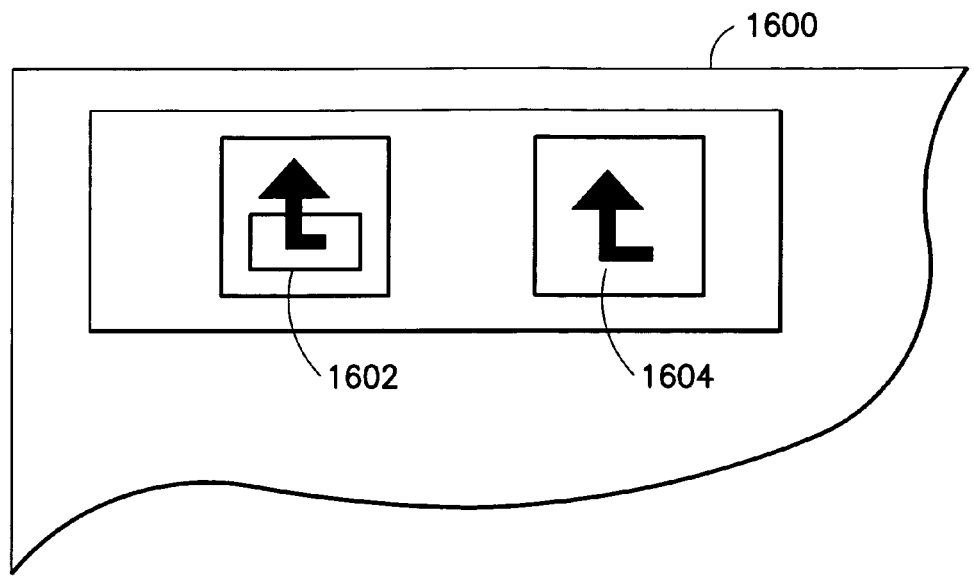
FIG. 22 depicts a zoomed-in view of a graphical user interface displaying a portlet control in accordance with an embodiment of the present invention.

FIG. 21 depicts an embodiment where child sub-portlets 1526, 1530 and management portlet 1522 have been launched from parent portlet 1520, and where child sub-portlets 1556, 1560 and management portlet 1552 have been launched parent portlet 1550. As can be seen, the child sub-portlets and management sub-portlets have been surfaced in close proximity to the parent portlets, thus forming groups of related parent portlets, management portlets, and child-sub-portlets. The grouping and indentation serves as a graphical indicator relating the parent and child sub-portlets. As is apparent child sub-portlet 1526 is maximized, but can be minimized with control 1527 or closed with control 1528. On the other hand, child sub-portlet 1530 is minimized, but can be maximized with control 1531 or closed with control 1532.

The foregoing embodiments of the present invention have started with the parent portlet as the base from which child sub-portlets operations are controlled. A further embodiment of the present situation depicted in FIG. 22 handles situations where many portlets appear on a page like preceding embodiment of the present invention, but from the perspective of a child sub-portlet. In such situations, a user who has been focusing on a child sub-portlet may wish to turn her attention to the parent portlet related to the child sub-portlet. In order so that the transition to the parent portlet may occur as rapidly as possible, a toolbar 1600 is incorporated somewhere in the child sub-portlet. The toolbar 1600 has two icons 1602 and 1604. Selection of icon 1602 would cause the parent portlet related to the child sub-portlet to become highlighted in some manner, so that the user's attention would be immediately drawn to the parent portlet. The highlighting could consist of momentary blinking of some feature of the parent portlet, or some other animation, including possibly scrolling the page so that the parent portlet is within view and prominently positioned. Selection of icon 1602 would cause the child sub-portlet to continue to be displayed. Selection of icon 1604, on the other hand, would close the child sub-portlet while at the same time highlighting the parent portlet.

Figure 23:
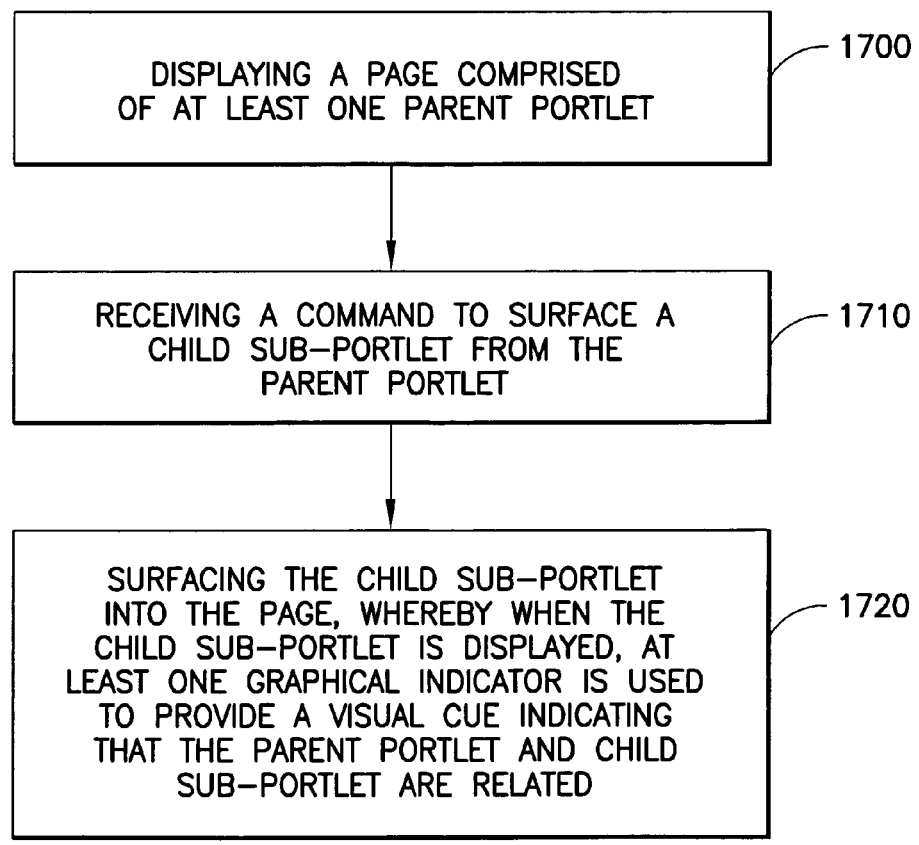
FIG. 23 depicts a flowchart showing the steps of method operating in accordance with the present invention.

In summary, the operation of a method in accordance with various embodiments of the present invention is depicted in FIG. 23, and is assumed to operate on a computer system like that depicted in FIG. 11. At step 1700, a page is displayed on a display device 906, where at least one parent portlet is displayed on the page. At step 1710, the computer system 900 receives a command to surface a child sub-portlet from the parent portlet currently being displayed from a user who entered the command with input system 907. By executing a program operable to perform the methods of the present invention, the data processor 901 at step 1720 surfaces the child sub-portlet into the page while using at least one graphical indicator to provide a visual cue indicating that the parent portlet and child sub-portlet are related.

In variants of the method depicted in FIG. 23 additional steps are performed. For example, the user could enter a command to minimize the child sub-portlet; in response, the data processor 901 would cause the child sub-portlet to be minimized. Alternatively, the user could enter a command to close the child sub-portlet; in response, the data processor would close the child sub-portlet.

Thus it is seen that the foregoing description has provided by way of exemplary and non-limiting examples a full and informative description of the best method and apparatus presently contemplated by the inventors for implementing portlet control indicia in interactive graphical user interfaces. One skilled in the art will appreciate that the various embodiments described herein can be practiced individually; in combination with one or more other embodiments described herein; or in combination with interactive graphical user interfaces differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A memory embodying a program of machine-readable instructions executable by a digital processing apparatus of a computer system to perform operations for controlling a graphical user interface system, where the graphical user interface system is capable of displaying multiple parent portlets in a single graphical user interface, the operations comprising:
displaying a page comprised of more than one parent portlets;
receiving a command to surface, at least one child sub-portlet from each of the more than one parent portlets displayed on the page;
surfacing the at least one child sub-portlet from each of the more than one parent portlets displayed on the page;
launching a management portlet on the displayed page for each of the more than one parent portlets having a surfaced at least one child sub-portlet, where the management portlet comprises controls for managing portlet operations relating to a parent portlet and the surfaced least one child sub-portlet of the portlet, where the management portlet operations comprise minimizing portlets, maximizing portlets, closing portlets, and surfacing portlets, singularly or on a group basis; and
displaying at least one graphical indicator comprising a collapser control and a connecting link tying a particular parent portlet of the more than one parent portlet, displayed on the page, to the at least one child sub-portlet surfaced from the particular parent portlet, where physical proximity and indentation are used in addition to the at least one graphical indicator to show a relation between the parent portlet, the management portlet, and the at least one child sub-portlet surfaced from the particular parent portlet.

2. The memory of claim 1 where the at least one child sub-portlet surfaced from a particular parent portlet of the more than one parent portlets displayed on the page is further displayed in a table-like structure within the management portlet launched on the displayed page for the particular parent portlet.

3. The memory of claim 1 where the at least one graphical indicator further comprises applying a similar background color to a particular parent portlet of the more than one parent portlets and the at least one child sub-portlet surfaced from the particular parent portlet, where the similar background color indicates that the particular parent portlet and child sub-portlet are related.

4. The memory of claim 1 where the at least one graphical indicator further comprises applying a similar shading to a particular parent portlet of the more than one parent portlets and the at least one child sub-portlet surfaced from the particular parent portlet, where the similar shading indicates that the particular parent portlet and child sub-portlet are related.

5. The memory of claim 1 where the at least one graphical indicator comprises incorporating a similar pattern somewhere in both a particular parent portlet of the more than one parent portlets and the at least one child sub-portlet surfaced from the particular parent portlet, where the pattern is unique to the particular parent portlet and any child sub-portlet launched from the parent portlet.

6. The memory of claim 5 where the similar pattern comprises hash marks in the title fields of a particular parent portlet of the more than one parent portlets and the at least one child sub-portlet surfaced from the particular parent portlet.

7. The memory of claim 1 where the at least one graphical indicator comprises displaying a particular parent portlet of the more than one parent portlets and child sub-portlet surfaced from the particular parent portlet in close proximity to one another, while indenting the child sub-portlet in relation to the particular parent portlet.

8. The memory of claim 1 where the operations further comprise:
displaying a child sub-portlet management control inline to the graphical indicator for each of the more than one parent portlets on the page having a surfaced at least one child sub-portlet.

9. The memory of claim 8 where the child sub-portlet management control comprises a control for closing the child sub-portlet.

10. The memory of claim 9 where the operations further comprise:
receiving a command to close the child sub-portlet entered with the child sub-portlet management control; and
closing the child sub-portlet.

11. The memory of claim 8 where the child sub-portlet management control comprises a control for minimizing or maximizing the child sub-portlet.

12. The memory of claim 8 where the child sub-portlet management control comprises a control for resizing the child sub-portlet.

13. The memory of claim 1 where the management portlet operations further comprise a control to close all sub-portlets with a single action, even if a sub-portlet is currently hidden from view.

14. A computer system for displaying an interactive graphical user interface, the computer system comprising:
at least one memory to store at least one program of machine-readable instructions, where the at least one program performs operations to display the interactive graphical user interface when executed; and
at least one processor coupled to the at least one memory, where the at least one processor performs at least the following operations when the at least one program is executed:
displaying a page comprised of more than one parent portlets in the graphical user interface;
receiving a command to surface at least one child sub-portlet from each of the more than one parent portlets into the page; and
surfacing the at least one child sub-portlet from each of the more than one parent portlets into the page
launching a management portlet on the displayed page for each of the more than one parent portlets having a surfaced at least one child sub-portlet, where the management portlet comprises controls for managing portlet operations relating to a parent portlet and the surfaced at least one child sub-portlet of the parent portlet, where the management portlet operations comprise minimizing portlets, maximizing portlets, closing portlets, and surfacing portlets, singularly or on a group basis; and
displaying at least one graphical indicator comprising a collapser control and a connecting link tying a particular parent portlet or the more than one parent portlet, displayed on the page, to the at least one child sub-portlet surfaced from the particular parent portlet, where physical proximity and indentation are used in addition to the at least one graphical indicator to show a relation between the parent portlet, the management portlet, and the at least one child sub-portlet surfaced from the particular parent portlet.

15. The computer system of claim 14 where the at least one child sub-portlet surfaced from a particular parent portlet of the more than one parent portlets on the displayed page is further displayed in a table-like structure within the management portlet launched on the displayed page for the particular parent portlet.

16. The computer system of claim 14 where the at least one graphical indicator further comprises applying a similar background color to a particular parent portlet of the more than one parent portlets and the at least one child sub-portlet surfaced from the particular parent portlet, where the similar background color indicates that the particular parent portlet and the at least one child sub-portlet are related.

17. The computer system of claim 14 where the at least one graphical indicator further comprises applying a similar shading to a particular parent portlet of the more than one parent portlets and the at least one child sub-portlet surfaced from the particular parent portlet, where the similar shading indicates that the particular parent portlet and the at least one child sub-portlet are related.

18. The computer system of claim 14 where the at least one graphical indicator further comprises incorporating a similar pattern somewhere in both a particular parent portlet of the more than one parent portlets and the at least one child sub-portlet surfaced from the particular parent portlet, where the pattern is unique to the particular parent portlet and any child sub-portlet launched from the parent portlet.

19. The computer system of claim 18 where the similar pattern comprises hash marks in the title fields of a particular parent portlet of the more than one parent portlets and the at least one child sub-portlet surfaced from the particular parent portlet.

20. The computer system of claim 14 where the at least one graphical indicator further comprises displaying a particular parent portlet of the more than one parent portlets and the at least one child sub-portlet surfaced from the particular parent portlet in close proximity to one another, while indenting the child sub-portlet in relation to the particular parent portlet.

21. The computer system of claim 14 where the operations further comprise:
displaying a child sub-portlet management control inline to the graphical indicator for each of the more than one parent portlet on the page having a surfaced at least one child-portlet.

22. The computer system of claim of claim 14 further comprising:
parent portlet identification means for receiving a command to identify a particular parent portlet of the more than one parent portlet to which a child sub-portlet relates, and for identifying the particular parent portlet.

23. The computer system of claim 22 where the parent portlet identification means further comprises:
highlighting means for at least momentarily highlighting the particular parent portlet.

24. A user interface control system method comprising:
displaying on a display device of a computer system an interactive graphical user interface having portlet display capability, wherein a page displayed in the interactive graphical user interface comprises more than one parent portlet displayed on the graphical user interface;
receiving a command to surface at least one child sub-portlet from each of the more than one parent portlet; and
surfacing the at least one child sub-portlet into the page from each of the more than one parent portlet into the page;
launching a management portlet on the displayed page for each of the more than one parent portlets having a surfaced at least one child sub-portlet, where the management portlet comprises controls for managing portlet operations relating to a parent portlet and the surfaced at least one child sub-portlet of the parent portlet, where the management portlet operations comprise minimizing portlets, maximizing portlets, closing portlets, and surfacing portlets, singularly or on a group basis; and
displaying at least one graphical indicator comprising a collapser control and a connecting link tying a particular parent portlet of the more than one parent portlet, displayed on the page, to the at least one child sub-portlet surfaced from the particular parent portlet, where physical proximity and indentation are used in addition to the at least one graphical indicator to show a relation between the parent portlet, the management portlet, and the at least one child sub-portlet surfaced from the particular parent portlet.

25. The user interface control system method of claim 24 where the at least one child sub-portlet surfaced from a particular parent portlet of the more than one parent portlets on the displayed page is further displayed in a table-like structure within the management portlet launched on the displayed page for the particular parent portlet.

26. The user interface control system method of claim 24 where the at least one graphical indicator further comprises applying a similar background color to a particular parent portlet of the more than one parent portlets and child sub-portlet surfaced from the particular parent portlet, where the similar background color indicates that the parent portlet and the at least one child sub-portlet are related.

27. The user interface control system method of claim 24 where the at least one graphical indicator comprises applying a similar shading to a particular parent portlet of the more than one parent portlets and a least one child sub-portlet surfaced from the particular parent portlet, where the similar shading indicates that the parent portlet and the at least one child sub-portlet are related.

28. The user interface control system method of claim 24 where the at least one graphical indicator comprises incorporating a similar pattern somewhere in both a particular parent portlet of the more than one parent portlets and at least one child sub-portlet surfaced from the particular parent portlet, where the pattern is unique to the parent portlet and any child sub-portlet launched from the parent portlet.

29. The user interface control system method of claim 24 where the at least one graphical indicator comprises displaying a particular parent portlet of the more than one parent portlets and at least one child sub-portlet surfaced from the particular parent portlet in close proximity to one another, while indenting the at least one child sub-portlet in relation to the parent portlet.

30. A memory storing at least one machine readable program, where the least one machine readable program is executable by a processor to perform actions comprising:
displaying more than one parent portlets on a display page;
displaying more than one child sub-portlet on the page for each of the more than one parent portlets;
launching a management portlet on the page for each of the more than one parent portlets, where the management portlet is displayed between a particular parent portlet of the more than one parent portlet and the more than one child sub-portlet for the particular parent portlet, and where the management portlet comprises controls for managing portlet operations relating to the particular parent portlet and the more than one child sub-portlet of the particular parent portlet, where the management portlet operations consist of minimizing portlets, maximizing portlets, closing portlets, and surfacing portlets singularly or on a group basis, where the management control is operable to close all of the more than one child sub-portlets displayed for a particular parent portlet, and where the more than one child sub-portlet surfaced from a particular parent portlet of the more than one parent portlets on the displayed page is further displayed in a table-like structure within the management portlet;

displaying on the page, more than one graphical indicator comprising a collapser control and a connecting link tying a particular parent portlet of the more than one parent portlet, displayed on the page, to the at least one child sub-portlet surfaced from the particular parent portlet into the page, where the more than one graphical indicator comprises using physical proximity and indentation to show a relation between a particular parent portlet of the more than one parent portlet, the management portlet, and the more than one child sub-portlet surfaced from the particular parent portlet, and where the more than one graphical indicator further comprises applying similar identifiers consisting of a similar background color, a similar shading, a similar pattern, and similar hash marks to a particular parent portlet of the more than one parent portlets and the more than one child sub-portlet surfaced from the particular parent portlet, where the similar identifiers indicate that the particular parent portlet and the more than one child sub-portlet are related; and displaying a child sub-portlet management control displayed on the page and inline to the graphical indicator for each of the more than one parent portlet on the page having a surfaced at least one child sub-portlet.

* * * * *